Aug. 6, 1957  A. R. TRAHERN, JR  2,801,713
BAND TYPE FLOATING SHOE BRAKE
Filed Oct. 27, 1952  4 Sheets-Sheet 1

INVENTOR.
Arlie R. Trahern Jr.
BY
Harness and Harris
ATTORNEYS.

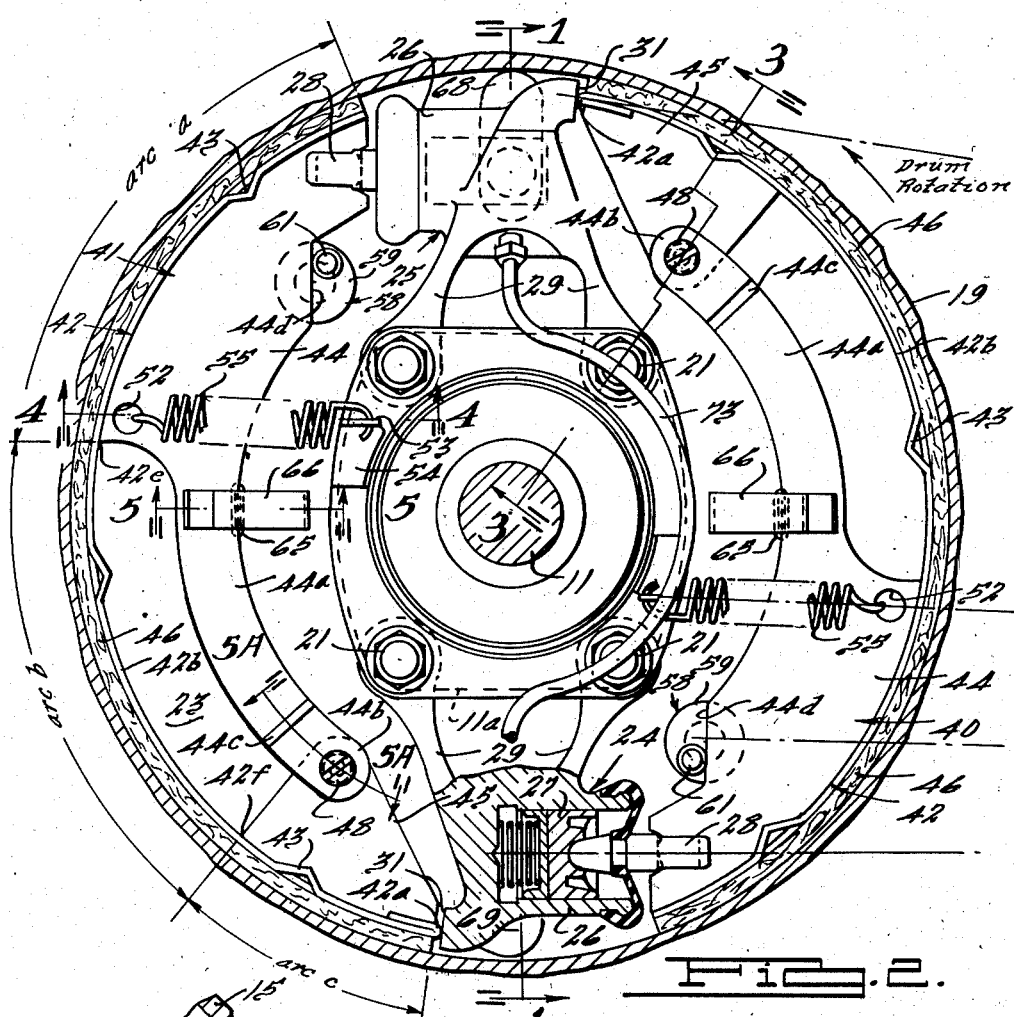
Fig. 2.
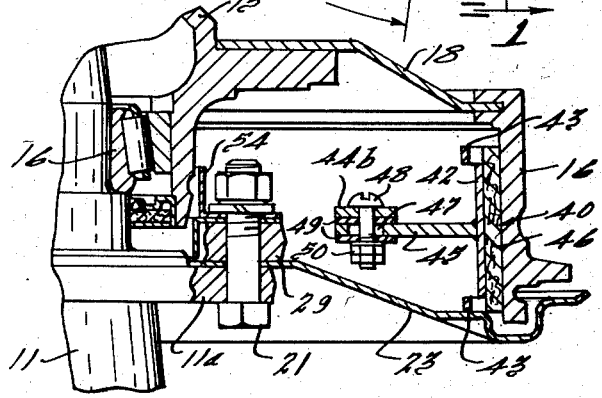
Fig. 3.
Fig. 5A.
INVENTOR.
Arlie R. Trahern Jr.
BY
Harness and Harris
ATTORNEYS.

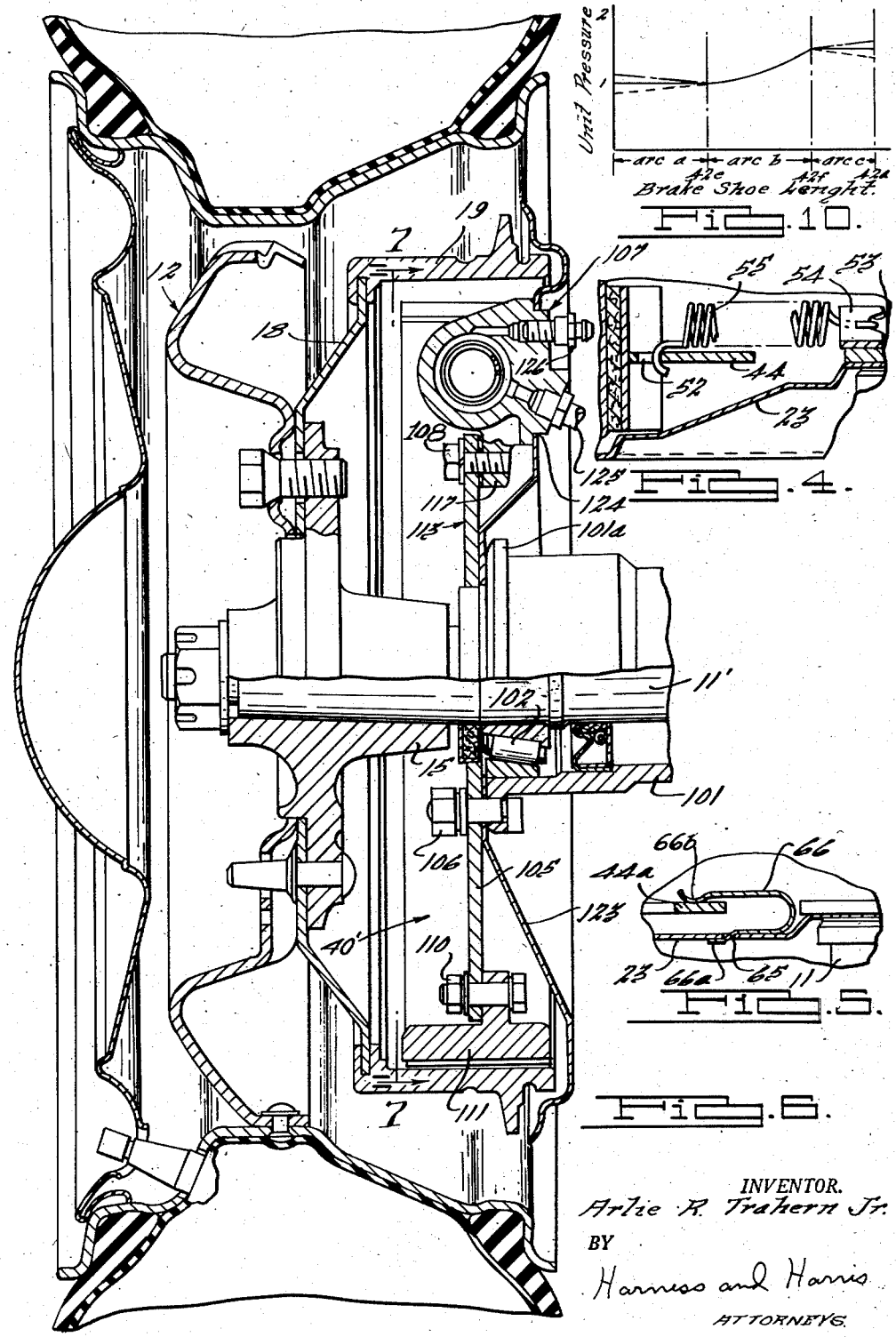

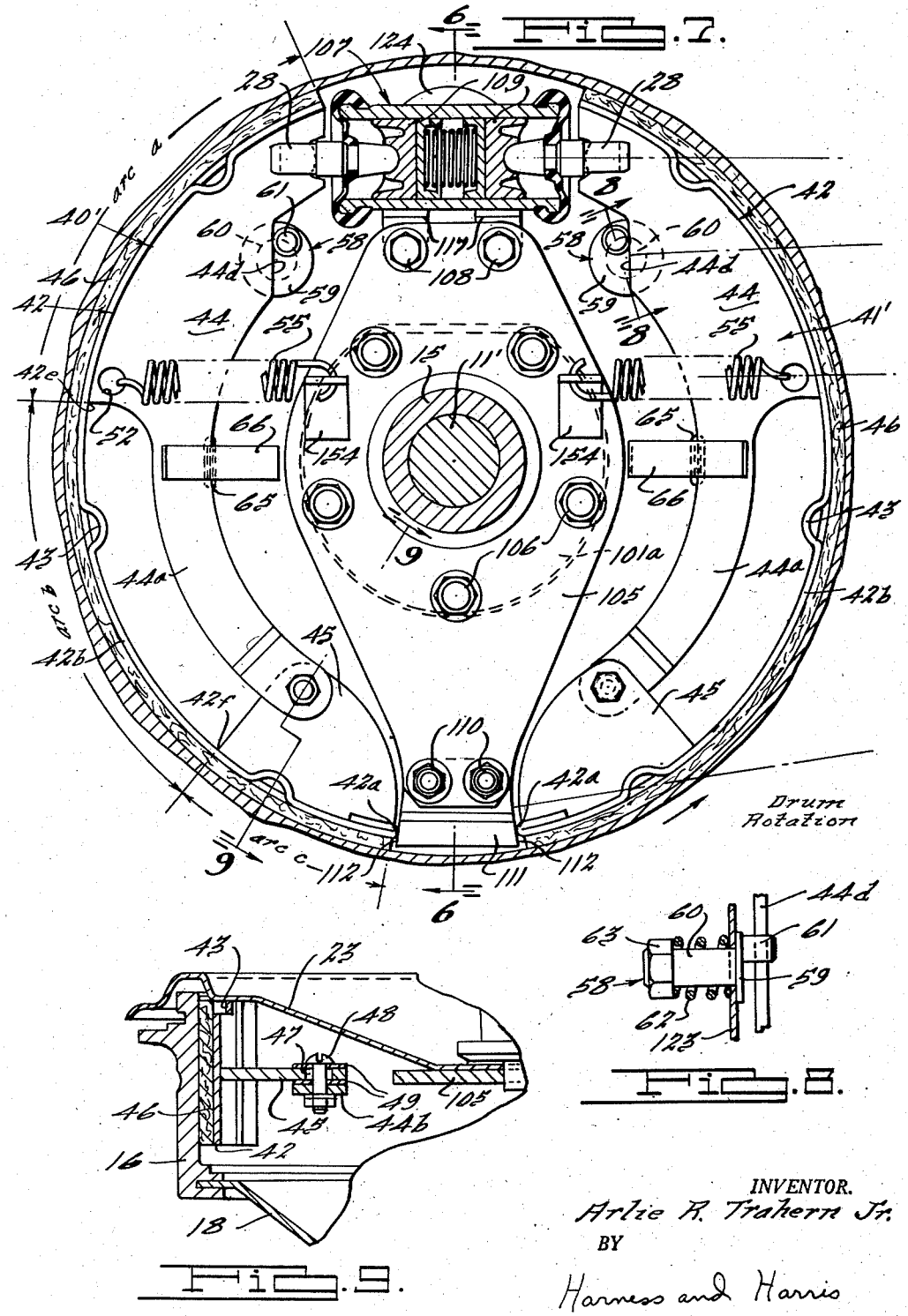

United States Patent Office 2,801,713
Patented Aug. 6, 1957

2,801,713

BAND TYPE FLOATING SHOE BRAKE

Arlie R. Trahern, Jr., Grosse Pointe Woods, Mich., assignor to Chrysler Corporation, Highland Park, Mich., a corporation of Delaware Application October 27, 1952, Serial No. 316,969

8 Claims. (Cl. 188—78)

This invention relates to expanding shoe brake mechanisms, and particularly to brake mechanisms utilizing "floating" brake shoes that are of the flexible band type.

It is a primary object of this invention to provide a brake mechanism having a "floating" brake shoe that will readily conform to the shape of the surrounding brake drum during braking and still tend to maintain its most efficient normal shape when the braking forces are released.

It is another object of this invention to provide a "floating" shoe brake in which the maximum friction area of the shoe table will be utilized during braking with consequent minimum peak braking pressures during braking operations.

It is a further object of this invention to provide a novel type of brake shoe having web portions adjacent each end of the shoe table or rim element and a webless, band type, table or rim portion intermediate the shoe ends.

It is still another object of this invention to provide a band type brake shoe with a substantially automatic drum radius of curvature adjustment.

It is still another object of this invention to provide an improved integral type of brake shoe actuating and brake shoe anchor device.

It is still another object of this invention to provide a brake with the greatest effective friction area for a given drum diameter and drum width.

It is another primary object of this invention to provide a brake shoe with a given, predetermined, longitudinal contact pressure distribution which will not be affected by brake drum growth or deflections due to heat and/or load.

It is still another object of this invention to provide a brake shoe with uniform distribution of contact pressure across its width, the shoe construction being such that this pressure distribution will not be affected by bending deflection of the shoe during braking.

It is still another object of this invention to provide a brake having a high degree of self-actuation that is not as sensitive to variation in coefficient of friction of the brake shoe lining material as the standard, rigid web type of brake shoe and which brake in particular has no tendency to self lock at high values of coefficient of friction.

It is still another object of this invention to provide an extremely stable, non-self-locking, "floating shoe" type of brake wherein the peak pressures encountered during braking will be lower than those encountered in known "floating shoe" brakes.

Other objects and advantages of this invention will become readily apparent from a reading of the following description and a consideration of the related drawings wherein:

Fig. 2 is a sectional elevational view of the brake construction shown in Fig 1, the view being taken along the line 2—2 of Fig. 1;

Fig. 3 is a fragmentary sectional elevational view of portions of the brake construction shown in Fig. 2, the view being taken along the line 3—3 of Fig. 2;

Fig. 4 is a fragmentary sectional elevational view of portions of the brake construction shown in Fig. 2, the view being taken along the line 4—4 of Fig. 2;

Fig. 5 is a fragmentary sectional elevational view of a portion of the brake construction shown in Fig. 2, the view being taken along the line 5—5 of Fig. 2;

Fig. 5A is a fragmentary sectional elevational view taken along line 5A—5A of Fig. 2;

Fig. 6 is a sectional elevational view taken along the line 6—6 of Fig. 7 showing a two shoe brake assembly embodying certain features of this invention, the brake shoes being arranged such that there is one leading shoe in each direction of brake drum rotation;

Fig. 7 is a sectional elevational view taken along the line 7—7 of Fig. 6;

Fig. 8 is a fragmentary sectional elevational view taken along the line 8—8 of Fig. 7;

Fig. 9 is a fragmentary elevational view taken along the line 9—9 of Fig. 7; and Fig. 10 is a graph displaying the unit pressure distribution lengthwise of the brake shoe.

Figure 1:
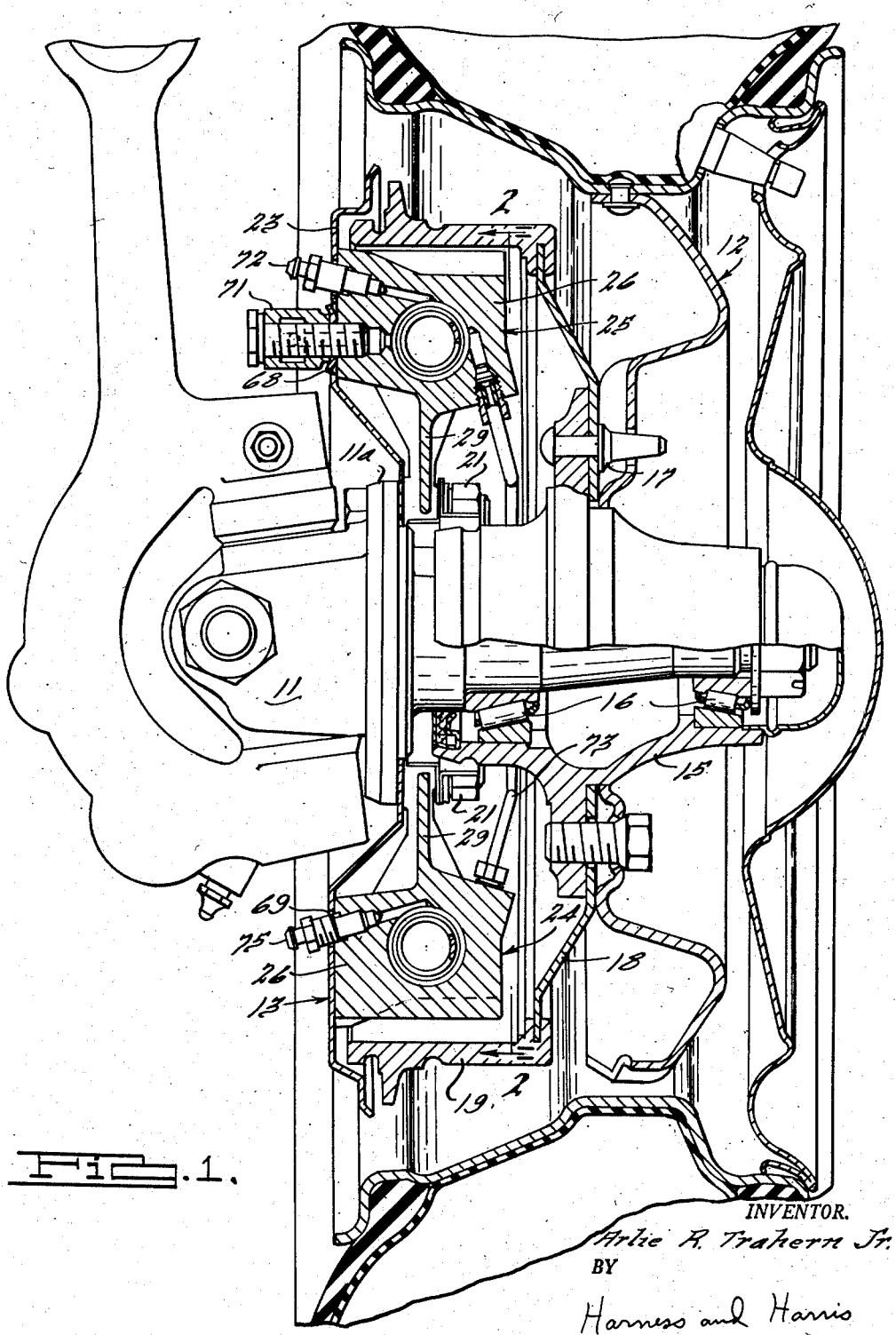
Fig. 1 is a sectional elevational view of a two leading shoe brake assembly embodying certain features of this invention, the view being taken along line 1—1 of Fig. 2.

The primary feature of the internal band brake herein disclosed is the shoe construction. This brake shoe (see Fig. 2) consists of three parts: (1) a relatively rigid leading shoe section 44, (2) a flexible, intermediate band section 42b that may readily reshape itself to conform to the shape of the deformable brake drum under any operating condition and one that will follow the hoop compression theory, and (3) a relatively rigid anchor shoe section 45. The leading shoe section 44 takes the actuating piston load and supplies a tangential or hoop compression load to the leading end 42e of the intermediate flexible band section 42b. It also supplies some self-actuation due to the friction load on the lining in the leading shoe section area. This produces a total input load to the leading end 42e of the intermediate flexible band section 42b which is greater than that due to the actuating piston load alone. The length of the leading shoe section 44 and its location with respect to the line of action of the actuating piston 27 are analytically determined so as to produce a uniform distribution of lining contact pressure in the leading shoe section area which is equal to the contact pressure due to hoop compression load at the leading end 42e of the intermediate flexible band section 42b. The intermediate flexible band section 42b is the main section of the shoe and produces the major portion of the self-actuation. Since contact pressure in this region is proportional to the hoop compression load in the flexible band, we obtain a build-up or increase in hoop load in the band and thus a progressive build-up in contact pressure and friction force proceeding from the leading end 42e to the trailing end 42f of the intermediate band section 42b due to the friction loads on the band. The shoe anchor section 45 is provided for the purpose of transmitting the load from the flexible band section 42b to the buttress surface 31 and is designed so that the shoe will have no tendency to buckle or self-lock. This detail of design is largely responsible for the elimination of the tendency to self-lock which has been evident in many previous band brake designs. Due to the friction forces on the lining in the area of the shoe anchor section 45, the force applied to the buttress 31 is greater than that obtained from the flexible band. The length of the shoe anchor section 45 and the location and angle of the buttress surface 31 relative to the shoe anchor section 45 are analytically determined so as to produce a uniform distribution of contact pressure in the shoe anchor section area which is equal to the contact pressure due to hoop compression load at the trailing end 42f of the intermediate flexible band section 42b.

The complete brake shoe may be of any desirable length which space limitations will allow. In general the greater the length of flexible band section 42b the greater the self-actuation. This novel shoe design has two inherent advantages as compared to other types of shoe brake designs, namely (1) controlled pressure distribution, and (2) greater stability.

As is indicated, the distribution of contact pressure over the entire length of the composite shoe is controlled. Also since the rigid sections 44, 45 are short and the intermediate flexible section 42b can conform to any deflected drum shape, this contact pressure distribution is not materially affected by drum distortions due to temperature and load. Therefore the contact pressure distribution under all conditions is substantially as shown in Fig. 10. The broken lines in Fig. 10 indicate expected variations due to spring forces and friction effects. Pressure distribution across the width of the shoe is also uniform since the band elements remain substantially straight when the band section 42b is deflected. This is not true of other shoe sections such as Ts or channels where the rim elements become curved due to the longitudinal stress on the curved fibers due to bending of the shoe. This property of controlled distribution of contact pressure permits the use of longer and wider shoes thus putting more lining in contact for a given size brake. It also eliminates the possibility of variations in pressure distribution and therefore self-actuation under braking conditions as can occur in other types of shoe brakes. It also assures that the peak pressures will be near the average pressure. This means that the brake will be less affected by operating conditions; that is, it will be more stable. Also, since the heat input to the brake is spread more evenly over a greater area of lining, the band brake of a given diameter or a given diameter and a given width will have more energy rate capacity and more resistance to fade than the current standard web-type shoe brakes.

Probably the most important advantage of this internal band type brake is its greater inherent stability. The method of obtaining self-actuation from the flexible band section 42b which is discussed above is entirely different from the method of obtaining self-actuation in other shoe type brakes and provides a brake which is much less sensitive to variations in the lining coefficient of friction. This is evidenced by the fact that, while most self-actuating shoe type brakes are self-locking at some coefficient of friction (usually two times the design coefficient or less), the internal band type brake, herein disclosed, is not self-locking at any coefficient of friction.

Another novel feature of this internal band type shoe construction is the friction connection 48—50 between the leading shoe section projection 44a and the anchor shoe section web portion 45. This construction causes the composite shoe to act as a single rigid body under the very light loads associated with bringing the shoe into or out of engagement with the drum 19. However, the friction between the leading shoe section and the anchor shoe section web portions at the point of contact is not sufficient to significantly affect the flexibility of the shoe under the heavier loads experienced when the shoe is in contact with the drum. In this way the shoe shape in the retracted positions conforms closely to that of the drum and permits close adjustment of the shoe to the drum without a complicated control system of return springs and cams. This feature is subsequently referred to as the automatic radius of curvature adjustment. It is also believed that this friction connection 48—50 between the leading shoe section and the anchor shoe section web portions may be used to damp shoe and drum vibrations which give rise to objectionable noise.

Considering Figs. 1–5 of the drawings, there is shown a brake assembly adapted for the front or steerable wheels of a motor vehicle or the like. The reference numeral 11 represents a steering knuckle that supports a wheel unit 12 and its associated brake assembly 13. Wheel unit 12 has its hub portion 15 rotatably mounted on the steering knuckle 11 by means of the bearings 16. Fixedly connected to the wheel hub 15 by the rivet means 17 is the cup-like brake drum 18. Brake drum 18 has an axially extending peripheral flange portion 19 that is adapted to have its inner surface engaged by the associated brake assembly brake shoes in order to provide braking action.

The brake assembly 13 is fixedly connected to the radially extending flange 11a of the steering knuckle 11 by means of the anchor bolts 21. Brake assembly 13 includes the radially extending backing or cover plate 23, that covers the open end of the brake drum 18, and the pair of radially extending brake shoe actuator assemblies 24, 25. It will be noted from Figs. 1 and 2 that the cover plate 23 is not required to transmit or take any torque reaction and for that reason this plate 23 may be of very light gauge metal or the like as its primary purpose is merely to serve as a dirt shield for the interior of the brake drum 18.

The brake shoe actuator elements 24 and 25 are substantially identical and for that reason only actuator 24 will be described. Actuator 24 is an integral casting consisting of a wheel cylinder portion 26 that mounts a reciprocable piston 27 in its bore. The piston element 27 is connected by a thrust link 28 to the toe end of the associated brake shoe 40. The wheel cylinder interior construction is conventional and for that reason additional description thereof is thought to be unnecessary. Extending radially inwardly and diverging from the wheel cylinder body portion 26 are a pair of support legs 29. The inner free ends of the support legs 29 are each fixed to the steering knuckle flange 11a by the anchor bolts 21. By virtue of the wheel cylinder support legs 29, the brake shoe actuating and reaction forces are transmitted to the steering knuckle 11 rather than to the brake drum backing plate 23 as is the case in most conventional brake assemblies. It will also be noted that the brake shoe actuator devices 24, 25 also provide a so-called "center plane mounted brake" wherein the thrust forces acting on the associated brake shoes extend in the plane of the shoe web and cylinder support legs 29 rather than in the plane of the backing plate 23. This eliminates moments or bending forces in the brake assembly that tend to cock the brake shoes and reduce their braking effect.

The brake shoe actuator cylinders 24, 25 each have the closed end of their cylinder portion 26 formed with a substantially radially extending brake shoe buttress or ramp surface 31. The ramp surfaces 31 are each adapted to slidingly receive the heel end of an associated brake shoe and thus the surfaces 31 provide the brake shoe anchor means during braking action. The heel ends of the brake shoes 40, 41 are formed so as to be capable of rolling and sliding action along the associated ramp surfaces 31 during braking action.

The brake shoes 40, 41 that form a very important part of this invention are identical in construction and for that reason only shoe 41 will be described. Brake shoe 41 comprises a flexible, band type, table or rim element 42 that extends approximately 150° circumferentially of the brake drum flange 19. At circumferentially spaced points along the table or rim element 42 the side portions thereof have substantially V-shaped grooves 43 struck radially inwardly therefrom so as to provide enlarged shoe guiding surfaces that slidably engage the inner face of the brake drum backing plate 23 (see Fig. 3). These guiding surfaces 43 are struck from each side edge of the shoe table or rim portion 42 so that each shoe is interchangeable with the other in a brake assembly of the type shown. The heel end of the shoe table or rim element 42 is folded over upon itself to provide a rounded end 42a that will readily slide and/or roll along the associated substantially radially extending shoe anchor ramp or buttress surface 31. Brake shoe rim element 42 is covered on its outer side with a suitable friction lining 46 that is pressed into engagement with the brake drum flange 19 during braking action.

The web element of brake shoe 41 is positioned centrally of the width of the table element 42 and is normal thereto. This web element is composed of two separate portions, namely the toe portion 44 and the heel portion 45. The web toe portion 44 is connected to the shoe table element 42 for approximately a distance of 60° circumferentially from the toe of the shoe towards the heel thereof (arc a). For the next approximately 60° from the toe towards the heel of the shoe 41 (arc b) there is no web portion in contact with the shoe rim or table portion 42 and consequently this central portion of the brake shoe 41, intermediate the web toe and heel portions 44, 45 constitutes a flexible band type brake shoe. The web heel portion 45 is connected to the shoe rim or table portion 42 for a distance of approximately 30° circumferentially from the shoe heel towards the shoe toe (arc c).

Projecting circumferentially from the toe web portion 44 towards the heel web portion 45 is a finger 44a. Finger 44a is spaced radially inwardly from the concentrically arranged shoe rim portion so that the finger 44a will not interfere with the free flexing of the rim band 42. The free end 44b of the toe portion web finger 44a is connected to the heel web portion 45 by a friction connection that permits limited relative movement between the finger end 44b and the web heel portion 45. This friction connection at the end 44b of web finger 44a is clearly disclosed in Fig. 3. The end 44b of the finger 44a is offset at the bend 44c so that the end portion 44b can overlap the heel web portion 45. Heel web portion 45 is provided with an aperture 47 that is considerably larger in size than the diameter of the shank of the bolt 48 that extends through the overlapped portions 44b, 45. Friction washers 49 are sandwiched between the overlapped web portions 44b, 45 and the nut 50 that is threaded on the bolt 48 holds the parts in assembled relationship and maintains the desired amount of compressive force between the overlapped members 44b, 45.

Connected between apertures 52, 53 in the shoe toe web portion 44 and the steering knuckle grease shield 54 respectively, is a resilient element such as the tension spring 55 (see Figs. 2 and 4). The spring 55 associated with each of the brake shoes 40, 41 serves as a shoe return spring that withdraws the shoe from engagement with the associated brake drum when the braking forces are released. Springs 55 also serve to hold the brake shoe heel portions 42a in continuous engagement with the associated ramp surface 31 and thus maintain the correct adjustment of the brake shoes relative to the surrounding brake drum.

Journaled in the brake assembly backing or cover plate 23, at diametrically opposed positions, are a pair of identical brake shoe drum clearance adjusting cams 58 (see Figs. 2 and 8). Each cam 58 (see Fig. 8) comprises a bolt with a head 59 and a shank 60. Eccentrically mounted on the head 59 is a stud 61 that is adapted to engage the side edge portion 44d of the brake shoe web portion 44. A compression spring 62 encircles the bolt shank 60 and is urged into engagement with the adjacent backing plate 23 of Fig. 1 or 123 of Fig. 6 by the nut 63 that is threaded on the bolt shank 60. As cam bolt 60 is rotated in the supporting backing plate, the eccentrically mounted stud 61 will move along the brake shoe web edge portion 44d and vary the clearance between the brake shoe lining and the surrounding brake drum flange 19. It is thought to be obvious that cams 58 control the clearance between the shoes and drum when the shoes are in drum disengaged or de-activated positions.

To assist in maintaining the brake shoes 40, 41 in their operative positions, the backing plates 23 and 123 (see Figs. 2, 5 and 7) are each provided with a pair of slots 65 that each mount a substantially J-shaped brake shoe hold-down spring 66. Spring 66 has one end 66a shaped to be seated in the backing plate slot 65 and the other end 66b is bent over the portion 66a to provide a spring finger that engages the associated shoe web portion 44a. Spring 66 urges the associated brake shoe against the backing plate 23 (Fig. 2) or 123 (Fig. 7) and tends to prevent shoe cocking. Springs 66 cooperate with the rim element backing plate bearing surfaces 43 in maintaining the brake shoes in a properly centered braking position.

The backing plate 23 is formed with a pair of diametrically opposed apertures 68 and 69. Aperture 68 receives the two fittings 71 and 72 that are part of the brake shoe actuator 25. Fitting 71 is connected to the brake master cylinder (not shown) by suitable conduit means so that pressurized fluid can be supplied to cylinder 25. A branch conduit 73 connects the bore of actuator 25 to the bore of actuator 24 so that each of the actuators 24, 25 can be simultaneously operated. Fitting 72 is an air bleed connection for bleeding the brakes. The aperture 69 in the backing plate 23 receives the bleed connection 75 of the brake shoe actuator 24.

When the brake assembly shown in Figs. 1–5 is to be activated, pressurized fluid from a master cylinder (not shown) is simultaneously forced into the wheel cylinder brake actuators 24, 25. Considering brake shoe 41 alone, as brake shoe 40 will operate simultaneously therewith and in the same manner, the pressurized fluid admitted to cylinder 25 will cause thrust link 28 of actuator 25 to move towards the left and swing the toe end 44 of shoe 41 about the pivot point where the heel portion 42a of the shoe 41 engages the ramp 31 on the closed end of actuator 24. As the brake shoe lining 46 engages the encircling brake drum flange 19, tangentially directed forces are applied to the shoe rim 42 that tend to rotate the shoe 41 counterclockwise about its pivot point 42a in the direction the brake drum 18 is turning. This friction engagement of the lined shoe rim 42 and the drum 19 and the resulting tendency for counterclockwise movement of the shoe 41 forces its heel end anchor portion 42a to move radially outwardly along the contacting ramp surface 31 and to seek that position on the associated ramp surface 31 that will place both the heel and toe rim portions as well as the portions of the rim intermediate the heel and toe in braking engagement with the brake drum flange 19. The action described so far is more or less typical of all "floating" shoe brakes. However, the particular brake shoe construction herein disclosed provides a means to achieve improved braking over that achieved in the conventional "floating shoe" brake that has an integral, full shoe length, rigid, web portion connected to its encircling rim portion.

The band type "floating" brake shoes 40, 41 are designed to be sufficiently flexible to permit the maximum amount of shoes lining 46 to be placed in braking contact with the encircling drum flange 19 and continuously held in engagement with the drum flange 19 during braking which results in maximum braking with the average unit braking pressure being relatively low. In addition, the sectionalized web construction has been designed such that the braking forces applied to the toe end of the shoe will be transmitted to the several sections of the rim element in such a manner that the peak pressures along the shoe lining will be a minimum and accordingly shoe lining wear is kept to a minimum. Because the pressure distribution is determinable and the peak pressures are kept low, a longer, more effective shoe can be safely used. Also, with relatively low peak braking pressures, a shoe lining with a more favorable or higher coefficient of friction can be used without danger of self locking. It is thought to be obvious that the flexible band section (arc b) intermediate the heel and toe portions 44, 45 of the shoe 41 can flex to completely conform to the surrounding brake drum flange 19 during all braking. This gives full contact between the shoe and drum flange in the area denoted by arc b in Fig. 2. Also, due to the toe portion (arc a) and the heel portion (arc c) being only a portion of the full length of the shoe 41 and being connected at their adjacent ends 42e and 42f to the long flexible intermediate brake band portion (arc b), each of the toe and heel end sections 44, 45 (arc a and arc c), can readily shift to insure that their full areas are in contact with surrounding brake drum flange 19 during braking. Furthermore, not only will the full area of the extremely long shoe rims be in contact with the drum during braking but the pressure distribution along the lengths of the shoes is known as are the peak pressures and thus a stable brake can be provided having maximum braking ability without any danger of self-locking or excessive wear.

It is a known fact that during braking the drum flange 19 often goes out-of-round as the braking pressures build up. Accordingly, with a brake shoe having a unitary, full length, rigid, web portion, it is difficult to keep the full area of the shoe lining in effective braking contact with the associated drum much less retain any sort of controlled or calculated pressure distribution along the shoe. On the contrary, the pressure distribution along a rigid web shoe as the drum goes out of round changes materially and the peak pressures increase considerably with respect to normal values with the result that heat is generated and fade and self locking may result.

Due to the shoes 40, 41 being formed of three connected sections or segments (arcs a, b and c) each with different rigidity characteristics, it will be found that the unit braking pressures along the lining 46 will vary somewhat rather than be uniform throughout the full length of the shoe (see Fig. 10). From Fig. 10 it will be noted that the unit pressures in the segment covered by arc a will be relatively low and substantially constant throughout the length of the toe section 44 although these pressures could vary slightly as shown by the broken lines. In the flexible band section, arc b, where the self-actuation is achieved, the unit braking pressures rise progressively from the input point 42e to the output point 42f. By the hoop compression theory it can be shown that the rate of pressure increases along the shoe band section, arc b, can be approximately determined from the expression $e^{f\phi}$ where $f$ is the coefficient of friction of the lining material 46 and $\phi$ is the angle between the force input point 42e and the particular point along the band section at which the pressure is to be determined. The unit pressures along the heel section 45 of the shoe are substantially constant and equal to about the peak pressure developed in the flexible band portion, arc b, of the shoe. It is possible for the pressures along the heel section 45 to vary slightly as shown by the broken lines. While the unit pressures are not uniform throughout the shoe, still the peak pressures are relatively low as is the average unit pressure and as a result less wear is developed in this brake than in other corresponding brakes.

While providing sufficient flexibility to give the maximum drum contact, still, the band type "floating" shoe herein disclosed is designed to have the necessary rigidity to cause it to function as a self-adjusting "floating" shoe. In this connection it should be pointed out that as the brake shoes 40, 41 are applied to the brake drum flange 19 their heel ends 42a automatically seek the positions along their respective anchor ramps 31 such that the maximum amount of shoe lining will be moved into initial engagement with the associated brake drum flange. As the brake shoe actuating force is released the brake shoe return springs 55 then rotate the toe ends of the shoes towards their associated cam seats 61. The retraction of the brake shoes by the return springs 55 involves merely a rotary or pivotal movement of the shoe toe about the existing point of contact 42a of the shoe heel and the associated ramp surface 31. There is no sliding or shifting movement of the shoe heel portion 42a along ramp surface 31 during brake shoe retraction. As the brake shoe is swung out of engagement with the brake drum, it is thought to be obvious that the shoe will be left in such a position that the next actuation of the brake shoe initially rotates the shoe about its heel pivot point 42a so as to again bring the shoe into contact with the encircling brake drum flange 19 throughout substantially the full length of the shoe. If brake lining wear occurs or any other change in brake geometry should take place during braking, still, the brake shoe will automatically adjust itself during brake application so that it exactly conforms to the shape of the brake drum and when braking is terminated still it will always tend to be positioned so as to subsequently present its maximum surface in contact with the associated drum surface.

If the brake shoes 40, 41 were simple, webless, band sections it is thought to be obvious that there would be no means of retaining the optimum shoe radius of curvature after a brake application and, furthermore, the brake shoe heel pivot point 42a on the ramp 31 would not be automatically retained in its optimum position after brake shoe retraction so as to keep brake assembly adjusted for maximum braking efficiency. The disadvantages of a "floating shoe" having a rigid web extending the full length of and fixedly connected to the shoe rim or table portion have been previously stated to arise from the fact that such a shoe can not readily conform to the change in shape of the brake drum during brake application. The flexible, segmented, shoe construction herein disclosed contains the advantages of both the unitary rigid web shoe and the band type shoe without the disadvantages of either.

The formation of each of the brake shoes 40, 41 with a web portion 44 at the toe end thereof rigidifies the shoe toe end sufficiently to receive and transmit the thrust of the associated actuator cylinder 24 or 25. The toe web portion 44 not only transmits the actuation force to the shoe so as to cause the brake shoe to rotate as a unit about its anchor ramp contact point but this web portion also applies the actuation force to the input point 42e of the flexible band in a predetermined manner so as to produce a controlled pressure distribution. The web portion 45 at the heel end of each shoe rigidifies the shoe at its heel end and applies the shoe braking forces to the associated anchor ramp 31 such that the band-like shoe can not buckle or develop inherent self-locking characteristics. Interconnecting the spaced apart toe and heel end web sections 44, 45 by the finger element 44a through the friction pivot connection 48 gives the shoe the necessary rigidity to maintain its most efficient radius of curvature and still permit relative movement between the toe and heel end of the shoe so that the shoe rim 42 can be automatically shaped to conform to the variable shape of the brake drum. Finger 44a being disconnected from the rim 42 permits the central or intermediate portion of rim 42 to flex longitudinally so as to shape itself to the surrounding drum 18 at all times. The friction connection 48 is sufficiently tight to retain the adjusted shoe radius of curvature on brake release so that the shoes act as unitary rigid web shoes on brake shoe retraction as well as during initial brake shoe drum application.

It will be noted that the brake shoe return springs 55 are positioned so that each exerts a shoe retracting force yet does not tend to shift the heel of the shoe 42a along the associated ramp 31. The location of the shoe actuators 24, 25, the anchor ramp surfaces 31, the return springs 55 and the drum clearance adjustment cams 61, 44d are such that the forces exerted by these elements on the associated shoes 40, 41 act along lines that substantially intersect at a common center. Such an arrangement prevents moments that would interfere with the automatic adjustment of the shoe heels 42a along the ramp 31. This relationship of the elements in the brake geometry is more fully explained in the co-pending application of Arlie R. Trahern, Serial No. 256,706, filed November 16, 1951, and is not claimed as a part of this invention.

Figs. 6–9 show the application of this invention to a wheel assembly, such as the rear wheel assembly of a motor vehicle, wherein two, "floating," band-type brake shoes 40', 41' are arranged to provide a single leading shoe for each direction of brake drum rotation. In Figs. 6–9 all elements that are identical to those described with relation to the Fig. 1–5 form of the invention have been assigned the same reference numeral.

The axle 11' corresponds to the steering knuckle 11 of Figs. 1–5. Axle 11' is journaled in an axle housing 101 by means of bearings 102. A wheel assembly 12 has its hub 15 drivingly mounted on the end of the axle 11'. The wheel assembly 12 carries a brake drum 18 that has an axially extending flange 19 adapted to be frictionally engaged by the expandable, band-type, "floating" brake shoes 40', 41'. The brake assembly 113 is supported on the spider plate 105. Spider 105 is fixedly mounted by bolts 106 on the radially extending flange 101a of the axle housing 101. Bolts 106 also fixedly mount a brake drum backing plate or dirt shield 123 on the axle housing flange 101a. At the upper end of spider 105 is a double piston brake shoe actuating cylinder 107. Cylinder 107 has radially extending legs 117 that are fixedly connected to the spider 105 by means of bolts 108. The pair of pistons 109 are each adapted to be moved axially to expand one of the band-type, "floating" brake shoes 40', 41'. Thrust links 28 connect each of the pistons 109 to a toe end of one of the brake shoes 40', 41'. Backing plate 123 is pierced by an opening 124 that receives the wheel cylinder pressure fluid connection 125 and the air bleed connection 126. At the lower end of spider 105, diametrically opposite the wheel cylinder 107, bolts 110 fixedly mount a brake shoe anchor plate 111 to the spider 105. Anchor plate 111 is of inverted T-shaped cross-section and has a pair of opposed, substantially radially extending ends that provide ramp or buttress surfaces 112 that engage the heel ends 42a of the pair of brake shoes 40', 41'. Shoes 40', 41' are identical to shoes 40, 41 previously described, so no additional description of the shoes 40', 41' is thought to be necessary. Operation of the shoes 40', 41' is identical to that previously set forth relative to shoes 40, 41. Spider 105 mounts a pair of angle brackets 154 to which the brake shoe return springs 55 are anchored. Guide springs 66 and clearance adjusting cams 58 are each mounted in the backing plate 123 in the same manner as described for the mounting of these elements in the backing plate 23 of the brake assembly shown in Figs. 1–5. While the Figs. 6–9 brake assembly 113 provides a single leading shoe in each direction of wheel rotation, rather than two leading shoes in one direction of drum rotation as is the case with the Figs. 1–5 assembly, the brake assemblies shown in Figs. 1–5 and Figs. 6–9 respectively are otherwise substantially identical.

I claim:

1. A brake shoe adapted to be floatingly mounted in a brake assembly comprising an arcuate, flexible, band-type rim element, having one end thereof reversely bent upon itself to provide a rounded end edge for sliding and/or rolling engagement with the ramp surface of a brake shoe anchor member, a first web portion connected to and extending normal to and longitudinally of the concave side of said rim element at one end thereof, a second web portion connected to and extending normal to and longitudinally of the concave side of said rim element at the other end thereof, said web portions collectively extending over less than two thirds the length of said rim element so as to provide a webless rim section intermediate the web-reinforced ends of the shoe that transmits the braking forces between the web reinforced ends and that is of such a substantial length that the braking force applied to one end of said shoe will be applied to the adjacent end of the webless rim section in such a manner that there will be a predetermined, controlled, rate of increase in unit pressures lengthwise of the webless rim section from the force applied end thereof towards the other end, and a finger-like projection extending from one of the web sections to the other and connected thereto by means providing for limited relative movement therebetween.

2. In an internal brake assembly including an annular brake drum and a fixed support located at the center of said brake drum, a brake shoe actuator comprising a hydraulic wheel cylinder having radially inwardly extending supporting portions fixedly mounted on said fixed support and having a reciprocable thrust member extending axially from one end of said cylinder, a brake shoe anchor member mounted on said fixed support at a position substantially diametrically opposite said wheel cylinder, said anchor member having a substantially radially extending ramp surface adapted to be slidably engaged by the heel end of the brake shoe associated therewith, and an arcuate brake shoe extending circumferentially of the drum between said wheel cylinder thrust member and the ramp surface of said anchor member, said shoe comprising a flexible, arcuate, band-type, rim element having a connected web portion at the inner side of the toe end thereof that is connected to the wheel cylinder thrust member and a connected web portion at the inner side of the heel end portion, said web portions being of such lengths that there is a webless rim portion of substantial length intermediate the adjacent ends of said toe and heel web portions arranged to receive and transmit the braking forces between the spaced apart web supported rim portions and to readily engage and conform to the encircling brake drum portions during braking, one of said web portions having a finger projecting therefrom towards said other web portion and connected thereto by friction pivot means that permit limited relative movement between the interconnected web portions, said shoe at the heel end edge having a convexly curved edge portion that engages the anchor ramp surface for sliding and/or rolling movement therealong.

3. In an internal brake assembly including an annular brake drum and a fixed support located at the center of said brake drum, a brake shoe actuator comprising a hydraulic wheel cylinder having radially inwardly extending supporting portions fixedly mounted on said fixed support and having a reciprocable thrust member extending axially from one end of said cylinder, a brake shoe anchor member mounted on said fixed support at a position substantially diametrically opposite said wheel cylinder, said anchor member having a substantially radially extending ramp surface adapted to be slidably engaged by the heel end of the brake shoe associated therewith, and an arcuate brake shoe extending circumferentially of the drum between said wheel cylinder thrust member and the ramp surface of said anchor member, said shoe comprising a flexible, arcuate, band-type, rim element having a connected web portion at the inner side of the toe end thereof that is connected to the wheel cylinder thrust member and a connected web portion at the inner side of the heel end portion, said web portions being of such lengths that there is a webless rim portion of substantial length intermediate the adjacent ends of said toe and heel web portions arranged to receive and transmit the braking forces between the spaced apart web supported rim portions and to readily engage and conform to the encircling brake drum portions during braking, one of said web portions having a finger projecting therefrom towards said other web portion and connected thereto by friction pivot means that permit limited relative movement between the interconnected web portions, said shoe at the heel end edge having a convexly curved edge portion that engages the anchor ramp surface for sliding and/or rolling movement therealong, and resilient brake shoe retracting means connected between said shoe and said support and arranged to urge the heel end edge of said shoe against said anchor ramp surface without causing movement therealong.

4. In an internal brake assembly including an annular brake drum and a fixed support located at the center of said brake drum, a brake shoe actuator comprising a hydraulic wheel cylinder having radially inwardly extending supporting portions fixedly mounted on said fixed support and having a reciprocable thrust member extending axially from one end of said cylinder, a brake shoe anchor member mounted on said fixed support at a position substantially diametrically opposite said wheel cylinder, said anchor member having a substantially radially extending ramp surface adapted to be slidably engaged by the heel end of the brake shoe associated therewith, and an arcuate brake shoe extending circumferentially of the drum between said wheel cylinder thrust member and the ramp surface of said anchor member, said shoe comprising a flexible, arcuate, band-type, rim element having a connected web portion at the inner side of the toe end thereof that is connected to the wheel cylinder thrust member and a connected web portion at the inner side of the heel end portion, said web portions being of such lengths that there is a webless rim portion of substantial length intermediate the adjacent ends of said toe and heel web portions arranged to receive and transmit the braking forces between the spaced apart web supported rim portions and to readily engage and conform to the encircling brake drum portions during braking, said web portions being of such length that the force transmitted from the brake shoe actuating wheel cylinder to the webless rim portion produces a predetermined, controlled, increase in unit braking pressures from the toe end of the webless rim section to the heel end of the webless rim section, one of said web portions having a finger projecting therefrom towards said other web portion and connected thereto by friction pivot means that permit limited relative movement between the interconnected web portions, said shoe at the heel end edge having a convexly curved edge portion that engages the anchor ramp surfaces for sliding and/or rolling movement therealong.

5. In an internal brake assembly including an annular brake drum and a fixed support located at the center of said brake drum, a pair of brake shoe actuating hydraulic wheel cylinders located within said drum at diametrically opposed positions, each wheel cylinder having radially inwardly extending portions fixedly connected to said fixed support and a piston actuated thrust member extending axially from one end of the cylinder bore, the opposite end of the cylinder bore being closed and having a brake shoe anchor ramp surface formed integrally therewith, said shoe anchor ramp surfaces each extending substantially radially of the brake drum and being adapted to slidably receive the heel end of an associated brake shoe, a pair of arcuate brake shoes arranged concentrically within said brake drum, each shoe extending between the thrust member of one wheel cylinder and the shoe anchor ramp surface of the other wheel cylinder, each brake shoe comprising a flexible, arcuate, band-type, rim element having a connected web portion at the inner side of the toe end thereof that is connected to a wheel cylinder thrust member and a connected web portion at the inner side of the heel end portion, said web portions being of such lengths that there is a webless rim portion of substantial length intermediate the adjacent ends of said toe and heel web portions arranged to receive and transmit the braking forces between the spaced apart web supported rim portions and to readily engage and conform to the encircling brake drum portions during braking, one of said web portions having a finger projecting therefrom towards said other web portion and connected thereto by friction pivot means that permit limited relative movement between the interconnected web portions, each shoe at the heel end edge having a convexly curved edge portion that engages an anchor ramp surface for sliding and/or rolling movement therealong.

6. In an internal brake assembly including a rotatable annular brake drum and a fixed support located at the center of said drum, a spider plate mounted on said fixed support and arranged to extend diametrically across the interior of said brake drum, said spider having at one end thereof a pair of opposed brake shoe actuating thrust members each of which is adapted to be connected to the toe end of a brake shoe and at the other end a pair of opposed, substantially radially extending, brake shoe anchor ramp surfaces that are each adapted to be slidably engaged with the heel end of a brake shoe, and a pair of arcuate shoes each having the toe end thereof connected to one of said actuating elements and the heel end mounted on one of said anchor ramp surfaces for sliding and/or rolling movement therealong, each brake shoe comprising a flexible, arcuate, band-type rim element having a connected web portion on the inner side at the toe end thereof and a longitudinally spaced apart, connected web portion on the inner side at the heel end thereof, said web portions being of such lengths that there is a webless rim portion of substantial length intermediate the adjacent ends of said toe and heel web portions arranged to receive and transmit the braking forces between the spaced apart web supported rim portions and to readily engage and conform to the encircling brake drum portions during braking, one of said web portions having a longitudinally extending finger projecting therefrom towards the other web portion and connected thereto by pivot means permitting limited relative movement therebetween.

7. A brake shoe adapted to be floatingly mounted in a brake assembly comprising an arcuate, flexible, band-type rim element, a first web portion connected to and extending normal to and longitudinally of the concave side of said rim element at one end thereof, a second web portion connected to and extending normal to and longitudinally of the concave side of said rim element at the other end thereof, said shoe end web portions collectively extending about half to two-thirds the length of said rim element so as to provide a webless rim section of at least one-third the shoe length intermediate the web-reinforced ends of the shoe that transmits the braking forces between the web-reinforced ends and that is of such a substantial length that the braking force applied to one end of said shoe will be applied to the adjacent end of the webless rim section in such a manner that there will be a predetermined, controlled, rate of increase in unit pressures lengthwise of the webless rim section from the force applied end thereof towards the end, and a fingerlike projection extending from one of the web sections to the other and connected thereto by means tending to produce unitary movement of the connected web sections while providing for limited relative movement therebetween, said fingerlike web section connecting projection being spaced from the intermediate webless rim section to permit unrestricted movement of the webless rim section so that it may continuously conform to the portions of a brake drum arranged adjacent thereto during all braking.

8. In an internal brake assembly including a rotatable brake drum and a relatively fixed support that mounts a brake shoe actuator and a fixed brake shoe anchor having a ramp surface extending substantially radially of said drum, said actuator and anchor being arranged within said drum and spaced apart circumferentially thereof, a brake shoe extending circumferentially of said drum between said actuator and said anchor and having the toe portion thereof connected to said actuator for outward drum engaging movement thereby and having the heel portion thereof mounted on said anchor ramp for sliding and/or rolling movement therealong substantially radially of the drum, said shoe comprising an arcuate, flexible, band-type rim element, a first web portion connected to and extending normal to and longitudinally at the concave side of said rim element at one end thereof, a second web portion connected to and extending normal to and longitudinally of the concave side of said rim element at the other end thereof, said shoe end web portions collectively extending only over about one-half of the length of said rim element so as to provide a webless rim section of approximately one-half the rim length intermediate the web-reinforced ends of the shoe that transmits the braking forces between the web reinforced ends and that is of such a substantial length that the braking force applied to one end of said shoe will be applied to the adjacent end of the webless rim section in such a manner that there will be a predetermined, controlled, rate of increase in unit pressures lengthwise of the webless rim section from the force applied end thereof towards the other end, and a fingerlike projection extending from one of the web sections to the other and connected thereto by friction means that tends to retain the connected web sections in predetermined relationships for unitary movement while providing for limited relative movement therebetween, said fingerlike web section connecting projection being spaced from the intermediate webless rim section to permit unrestricted movement of the webless rim section so that it may continuously conform to the portions of a brake drum arranged adjacent thereto during all braking.

References Cited in the file of this patent

UNITED STATES PATENTS

| | | |
|---|---|---|
| 1,876,265 | Tucker et al. | Sept. 6, 1932 |
| 2,063,936 | Kratzer | Dec. 15, 1936 |
| 2,192,004 | Burger | Feb. 27, 1940 |
| 2,215,567 | Schnell | Sept. 24, 1940 |
| 2,404,397 | Oetzel | July 23, 1946 |
| 2,595,143 | House | Apr. 29, 1952 |
| 2,621,761 | Smith | Dec. 16, 1952 |

FOREIGN PATENTS

| | | |
|---|---|---|
| 280,334 | Great Britain | Nov. 17, 1927 |
| 53,716 | France | Mar. 25, 1946 |